United States Patent [19]

Jordan et al.

[11] Patent Number: 4,824,297

[45] Date of Patent: Apr. 25, 1989

[54] THREAD FORMING APPARATUS HAVING TANGENTIAL CHASERS FOR CUTTING A THREAD ON A RAILROAD SPIKE

[75] Inventors: Chalmer Jordan, Saegertown; Lee Connor, Meadville; Robert Lybarger, Meadville; Charles Gutshall, Waynesboro, all of Pa.

[73] Assignee: Saegertown Manufacturing Corporation, Saegertown, Pa.

[21] Appl. No.: 92,624

[22] Filed: Sep. 3, 1987

[51] Int. Cl.⁴ .............................................. B23G 5/04
[52] U.S. Cl. ..................................... 408/217; 10/111; 408/221
[58] Field of Search ............... 408/215, 216, 217, 218, 408/219, 221, 222; 10/101 R, 111, 120.5 R

[56] References Cited

U.S. PATENT DOCUMENTS

| | | | |
|---|---|---|---|
| 1,936,696 | 11/1933 | Thomson | 408/221 |
| 2,067,593 | 1/1937 | Benninghoff | 10/111 |
| 2,378,951 | 6/1945 | Reimschissel | 408/217 |
| 2,908,022 | 10/1959 | Strobel | 408/218 |
| 3,093,850 | 6/1963 | Kelso | 408/218 |
| 4,278,374 | 7/1981 | Wolosianski | 409/77 |

FOREIGN PATENT DOCUMENTS

| | | | |
|---|---|---|---|
| 610362 | 9/1926 | France | 10/111 |
| 154310 | 5/1956 | Sweden | 10/111 |
| 223923 | 10/1924 | United Kingdom | 10/111 |
| 757709 | 9/1954 | United Kingdom | |

Primary Examiner—Gil Weidenfeld
Assistant Examiner—Daniel W. Howell
Attorney, Agent, or Firm—Oliff & Berridge

[57] ABSTRACT

The present invention relates to a device for cutting a thread on a railroad spike. The device employs tangential chasers which are designed to form a thread on a cylindrical portion and a tapering portion of the shank. The chasers form a thread having a constant pitch, root and crest diameter. The chasers are also designed to provide a gap of constant length between the forward flank of a thread on one turn and the rearward flank of the thread on an adjacent turn.

19 Claims, 3 Drawing Sheets

THREAD FORMING APPARATUS HAVING TANGENTIAL CHASERS FOR CUTTING A THREAD ON A RAILROAD SPIKE

BACKGROUND AND SUMMARY OF THE INVENTION

1. Field of the Invention

The present invention relates to a thread forming apparatus having tangential chasers for cutting a thread on a railroad spike. More particularly, the present invention relates to a thread forming apparatus having tangential chasers with particular cutting edge profiles for tapering and cutting a thread on a large railroad spike wherein the thread has a pitch crest diameter, root and a relatively large gap between successive turns of the thread, all of which remain constant for the length of the thread.

2. Description of Related Art

A railroad spike fastens a rail to a wooden tie of a railroad. A commonly used railroad spike is known as the "Tirefond" or "North American" railroad spike which is illustrated in FIG. 1. That spike includes a tool receiving head 10 and a shank 12 with a tip 13. The shank has a cylindrical portion 14 and a tapered portion 16 which increases in diameter from the cylindrical portion 14 upwardly toward the head 10. The diameter of the cylindrical portion is preferably about 0.657 to 0.664 inches while the diameter of the tapered portion adjacent the head is about 0.924 inches. Preferably, the length F1 of the tapered portion 16 of the shank is about 1.75–2.00 inches, while the length F2 of the cylindrical portion 14 is about 2.5 inches.

The shank 12 is threaded across the cylindrical and tapered portions so that a tool acting on the head can screw the spike into the tie. When the spike is screwed fully into the tie, a collar 18 located between the head 10 and the tapered portion 16 of the shank caps the screw hole to prevent ingress of water and other corrosives.

The spike must resist forces tending to pull-out or loosen the spike due to vibrations caused by trains passing over the rails. Accordingly, the thread arrangement on the shank is critical to the resistance of the shank to pull-out and loosening. The thread form of the Tirefond or North American spike (illustrated in FIG. 1) has its thread beginning at the top of the tapering portion 16 and helically progressing downward toward the tip 13 of the cylindrical portion 14 of the shank. The angle which the flank of the thread facing the head (i.e., the upper flank) makes with the normal to the axis of the spike is smaller than the angle which the flank of the thread facing the tip of the spike (i.e., the lower flank) makes with the normal. The length of the root R or base of the thread is constant and is preferably about 0.157 inches. The height K of the threads from the surface of the cylindrical portion of the shank to the crest of the thread is preferably about 0.128 inches. The spike has a constant crest diameter so that the height of the threads from the surface of the spike decreases as the thread progresses up the tapering portion of the spike. The crest diameter H is preferably between 0.913 and 0.920 inches.

In the railroad spike illustrated in FIG. 1, the pitch P (i.e., the distance between corresponding portions of adjacent turns of the thread) is constant and relatively large, for example 0.5 inches and preferably about 0.492 inches between adjacent thread crests. A gap G exists between the upper flank of one thread turn and the lower flank of an adjacent thread turn. The gap G is constant for all thread turns and has a length of about 0.3–0.4 inches and preferably about 0.335 inches.

The formation of the above-described thread is difficult due to the relatively large amount of material which must be removed from the gap G between the threads. Moreover, the formation of the thread is complicated by the constant root and crest diameter of thread, especially on the tapering portion of the shank.

One method of forming the threads on a spike is by hot rolling (e.g., see British Patent Specification No. 757,709 filed May 12, 1953) in which a heated, blank or unthreaded spike is introduced between rollers having a complimentary thread to that for formation on the spike. The complimentary threads impress the red hot spike with their thread design. Hot rolling is costly in terms of energy consumption and not particularly accurate in terms of thread precision.

U.S. Pat. No. 4,278,374 discloses a milling apparatus for cutting a thread on a cylindrical railroad spike while tapering the shank. In that apparatus, a tool holder ring is rapidly and eccentrically rotated about a workpiece which is axially advanced relative to the tool holder. The tool holder ring supports a plurality of single point cutting elements disposed in a series of adjacent planes, the number of planes increasing with the degree of tapering in the shank. During each revolution of the tool holder ring, the cutting elements intermittently and successively tangentially contact the workpiece to chip away the material to form the thread. However, this milling technique does not form a proper thread on a railroad spike. In particular, the withdrawal of the single point cutters from the thread chips the spike to form a less precise thread with a poor run-out or thread ending. Moreover, the intermittent chipping operation is relatively slow and thus does not facilitate a smooth, economical operation. The milling apparatus is also difficult to set up and adjust.

In some screw threading operations, tangential chasers are preferable to milling and/or rolling since the chasers continuously contact the workpiece to "peel" material from the screw in a relatively quick operation. For example, it has been known to use tangential chasers in a screw threading operation in which a gap does not exist between the flanks of adjacent teeth (e.g., see U.S. Patent No. 2,067,593). However, tangential chasers have not been used to cut the thread on the Tirefond or North American railroad spike since a chaser has yet to be designed to accommodate both the large gap between the flanks of adjacent thread turns and the large diameter of the spike. Moreover, the thread requirements of a constant root and crest diameter on the tapering portion of the spike complicates the manufacture of the chasers since the cutting edge of each chaser must be manufactured individually.

It is a primary object of the present invention to provide a thread forming apparatus which obviates the above-identified disadvantages associated with the prior art.

It is a further object of the present invention to provide a thread forming apparatus having tangential chasers for cutting a thread with a relatively large gap between adjacent turns of the thread.

Another object of the present invention is to provide a thread forming apparatus having tangential chasers for cutting a thread having a constant root and constant crest diameter on a Tirefond or North American railroad spike.

It is a further object of the present invention to provide a thread forming apparatus having tangential chasers for cutting a thread having a constant crest diameter and root on a railroad spike while cutting the tapering portion of the railroad spike.

In accordance with the present invention, the apparatus for cutting threads in the railroad spike includes a tool holder having a central axis, and means for rotatably and axially advancing a blank spike relative to the tool holder along the central axis. The spike is advanced so that the tip of the shank is located forwardly of the head of the spike in an advancement direction of the spike.

A plurality of chasers are fixedly supported in the tool holder in a symmetrical arrangement about the central axis for tapering the shank while cutting a thread having a constant pitch, root and crest diameter. Each of the chasers has a serrated cutting edge profile that includes a series of cutting edges alternating with a series of thread forming notches. Each of the thread forming notches has a forward flank and a rearward flank intersecting at a crest of the notch. Forward and rearward flank angles are defined respectively between the forward flank angle and a normal to the central axis, and the rearward flank and the normal. Each of the notches has a constant root and forward and rearward flank angles different from an adjacent notch.

Each of the cutting edges is defined between a forward flank of one notch and a rearward flank of a preceding notch. The crests of adjacent notches are separated by one pitch, while the cutting edges have equal lengths each of which corresponds to the gap between adjacent turns of the thread. The series of cutting edges on each chaser penetrates successively deeper into the spike in the advancement direction of the spike.

Each of the plurality of chasers has a different cutting edge profile. A cutting edge in the series of cutting edges on one chaser is located rearwardly of and penetrates successively deeper than a corresponding cutting edge in the series of cutting edges on a preceding chaser. The forward and rearward thread cutting notches on one notch on one chaser are no greater than the forward and rearward flank angles on a corresponding notch on a preceding chaser. The chasers in accordance with the presently claimed invention permit a thread to be cut with a relatively large gap between adjacent turns of the thread, while accommodating the constant root and crest diameter of the thread across the tapering portion of the shank.

BRIEF DESCRIPTION OF THE DRAWINGS

The present invention will be described hereinafter in detail in connection with the appended drawings in which like elements bear like reference numerals, and wherein.

DETAILED DESCRIPTION OF THE PREFERRED EMBODIMENT

Figure 1:
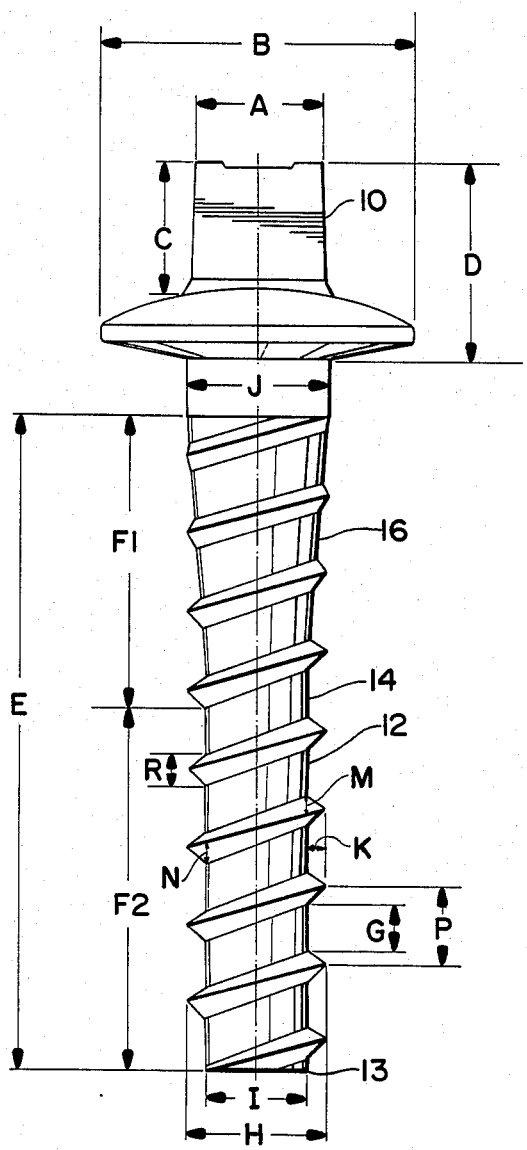
FIG. 1 is a front view of the Tirefond or North American spike illustrating the particular thread arrangement.

The Tirefond or North American railroad spike is illustrated in FIG. 1 and has been described above. Preferred dimensions for the spike and thread are listed below in Table 1.

TABLE 1

| Characteristic | Reference Letter in FIG. 1 | Appropriate Dimension (inches) |
|---|---|---|
| Width of Head | A | .875–.905 |
| Diameter of Collar | B | 2.008–2.047 |
| Height of Head from top of Collar | C | .787–.866 |
| Distance between top of Head and base of Collar | D | 1.220–1.299 |
| Length of Shank | E | 4.0–4.25 |
| Length of tapered portion in shank | F1 | 2.75–2.0 |
| Length of cylindrical portion in shank | F2 | 2.5 |
| Gap distance | G | .335 |
| Crest diameter | H | .913–.920 |
| Diameter of cylindrical portion | I | .657–.664 |
| Diameter of tapered portion | J | .924 max |
| Height of crest in cylindrical portion | K | .128 |
| Axial length traversed by upper flank | M | .069 |
| Axial length traversed by lower flank | N | .088 |
| Pitch | P | .492 |
| Length of root of thread | R | .157 |

Figure 2:
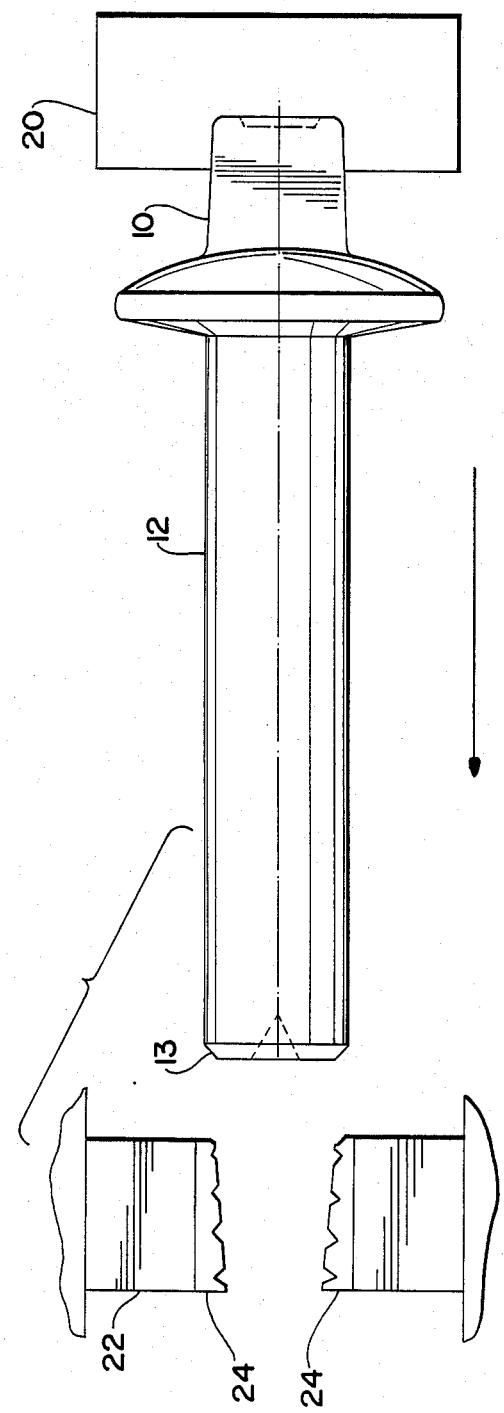
FIG. 2 is a schematic view of the overall thread forming apparatus.

The apparatus for cutting a blank or unthreaded spike with the thread having the characteristics set forth in Table 1 is illustrated schematically in FIG. 2. The apparatus includes a lathe or other mechanism 20 for grasping the blank spike. The blank spike includes the head and collar, but has an unthreaded shank of constant diameter (i.e., no tapered portion) of preferably about 0.924 inches. The lathe 20 axially advances the spike toward a die stock or tool holder 22 such that the tip 13 of the spike is located forwardly of the head 10 in the advancement direction of the lathe (illustrated by the arrow in FIG. 2). The tool holder rotates relative to the spike.

Those skilled in the art recognize that the apparatus may be altered such that the tool holder is fixed and/or axially advances toward a rotating spike without departing from the spirit and scope of the invention. Moreover, those skilled in the art recognize that the design and location of the chasers for cutting the thread may be altered to cut an internal thread, rather than the external thread illustrated in FIG. 2.

In the preferred embodiment, a set of four chasers 24 is fixedly supported in the tool holder ring 22 with the chasers 24 being symmetrically supported in an annular arrangement about the central axis of the shank. The chasers form the cylindrical portion and the tapered portion in the spike while cutting the thread across the cylindrical and tapered portions. Each chaser has a specific cutting profile for cutting one quarter of each thread turn. Those skilled in the art recognize, however, that the principles of the invention are applicable to a set of chasers having more or less than four chasers.

The profiles of the chasers 24 are illustrated in FIGS. 3A–3D. Each chaser 24a, 24b, 24c, 24d includes a serrated cutting edge 30 and an opposite supporting edge 32 which is gripped by suitable fastening means in the tool holder. The serrated cutting edge 30 tangentially contacts the spike to "peel" material from the spike. As the spike enters the tool holder, the shank of the spike progressively travels from a forward end 26 of the chaser toward a rearward end 28 in the direction of advancement of the spike (from right to left as illustrated by the arrow in FIGS. 3A–3D).

Figure 3A:
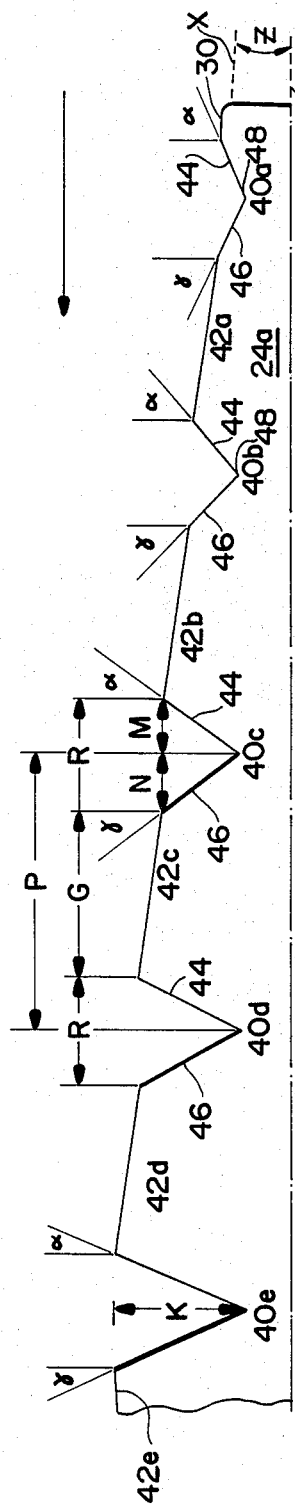
FIGS. 3A-3D are plan views of preferred embodiments of the cutting edge profiles for each of the chasers.

As illustrated in FIG. 3A, a master or first chaser 24a has a profile which includes a series of thread forming notches 40a, 40b, 40c, 40d alternating with a series of cutting edges 42a, 42b, 42c and 42d for forming the tapering portion of the shank with the thread cut therein. An additional notch 40e and cutting edge 42e are provided on the first chaser for forming the cylindrical portion with the thread thereon. As used herein, the term "series" includes the notches and cutting edges on a chaser relating to the tapered portion of the spike and will exclude the additional notch and cutting edge relating to the cylindrical portion of the spike.

A first notch 40a is located at the forward end of the chaser and is followed by the succeeding notches 40b, 40c, 40d in the series of notches. The number of notches in the first chaser necessary to form the thread on the tapered portion is determined by the length of the tapering portion (approximately 2 inches) divided by the pitch (approximately 0.5 inches). However, the first chaser requires the additional notch 40e and cutting edge 42e to form the cylindrical portion of the shank with the thread thereon. That is, on the first chaser, the first four notches 40a–40d form the thread on the tapering portion, while the fifth and last notch 40e forms the thread on the cylindrical portion. As noted above, the number of notches before the fifth or last 40e notch may vary depending on the length of the taper and desired pitch.

Each notch on the first chaser includes a forward flank 44 and a rearward flank 46 which intersect at a crest 48 of the notch. The crest 48 is preferably a relatively short, flat surface, but may be a point or a rounded surface. Except for the first notch, the forward flank 44 of each notch makes an angle $\alpha$ with the normal to the axis of the spike which is less than the angle $\gamma$ formed between the rearward flank 46 and the normal. As used herein, the angle $\alpha$ will be referred to as the forward flank angle, while the angle $\gamma$ will be referred to as the rearward flank angle. In relation to the thread illustrated in FIG. 1, the forward flank 44 corresponds to the upper flank, while the rearward flank 46 corresponds to the lower flank.

The cutting edges 42a, 42b, 42c, 42d are defined between the forward flank 44 of one notch and a rearward flank 46 of a preceding notch. The length of each cutting edge is constant and corresponds to the size of the gap G between adjacent turns of the thread. Further, since the thread has a constant pitch, the distance P between crests of adjacent notches is constant and equal to one pitch. In the preferred embodiment, the cutting edge has a length of preferably about 0.335 inches corresponding to the length of the gap G, while the distance between crests equals the pitch P of the threads which is preferably about 0.492 inches.

The series of notches 40 and cutting edges 42 on the first chaser 24a must produce a thread having a constant crest diameter while tapering the shank. Since the shank increases in diameter along the tapering portion, the crest of the thread on the tapering portion must decrease in height relative to the surface of the spike on the tapering portion. To cut the taper, each of the cutting edges 42 penetrates successively deeper into the surface of the shank than the preceding cutting edge. That is, for example, the cutting edge 42b between the second and third notches 40b, 40c penetrates deeper into the spike than the cutting edge 42a between the first and second notches 40a, 40b on the first chaser. In other words, a line x defined by the series of cutting edges 42a–42d on a chaser forms an angle z with a line y parallel to the central axis of the spike. In the preferred embodiment, the angle z is approximately four degrees (4°) which corresponds to the rate of taper in the tapering portion of the shank. The additional cutting edge 42e penetrates deeper than the series of cutting edges, but is not located along the line x. Rather, the additional cutting edge 42e is located along a line generally parallel to the central axis of the shank because the additional cutting edge cuts the cylindrical portion of the shank.

Since the cutting edges on one chaser cut successively deeper into the spike, and since the crest diameter is constant, the depth of the notches on the chaser progressively increases from the forward end toward the rearward end. That is, the depth of the first notch 40a on the first chaser 24a is less than the depth of the second notch 40b on the first chaser. The depth of the last or additional notch 40e on the first chaser corresponds to the crest height of the thread on the cylindrical portion of the shank. In the preferred embodiment, the depth of the last notch 40e on the first chaser 24a is preferably about 0.128 inches, which corresponds to the crest height K of the thread on the cylindrical portion. The series of notches preceding the last notch 40e on the first chaser decrease in depth to form the appropriate crest height on the tapering portion.

Even though the notches increase in depth in the advancement direction of the spike, the root R of each notch remains constant so that the thread formed on the spike has a constant root R. Preferably the root is about 0.157 inches. The root has two components: the axial length traversed by the forward flank M, and the axial length traversed by the rearward flank N. The axial lengths M, N are constant and preferably about 0.069 and 0.088 inches, respectively. The axial length traversed by the forward flank M is less than the axial length traversed by the rearward flank N because the forward flank angle $\alpha$ is less than the rearward flank angle $\gamma$.

Since the root R of each notch remains constant and since the crest diameter remains constant, the forward and rearward flank angles $\alpha$, $\gamma$ change for each notch on each chaser, thereby providing each chaser with a different profile than an adjacent chaser. In particular, the forward and rearward flank angles in a series of notches on one chaser successively decrease in the advancement direction of spike. That is, the angle $\alpha$ of the forward flank 44 of the second notch 40b is less than the angle $\alpha$ of the forward flank of the first notch. Similarly, the angle $\gamma$ of the rearward flank of the second notch is less than the angle $\gamma$ of the rearward flank of the first notch. The angles $\alpha$, $\gamma$ of the last notch 40e of the first chaser are no greater than the flank angles of the preceding notches, and correspond to the flank angles of the thread formed on the cylindrical portion of the shank. Preferred flank angles are listed in Table 2.

Except for the first notch 40a the forward flank angle of a notch on the first chaser is less than the rearward flank angle for that notch. The first notch 40a of the first chaser 24a has a forward flank angle which is greater than the rearward flank angle because of the 4° rate of taper of spike. In particular, the 4° rate of taper requires the forward flank angle of the first notch on the first chaser to exceed the rearward flank angle in order that the root and crest diameter remain constant.

Figure 3B:
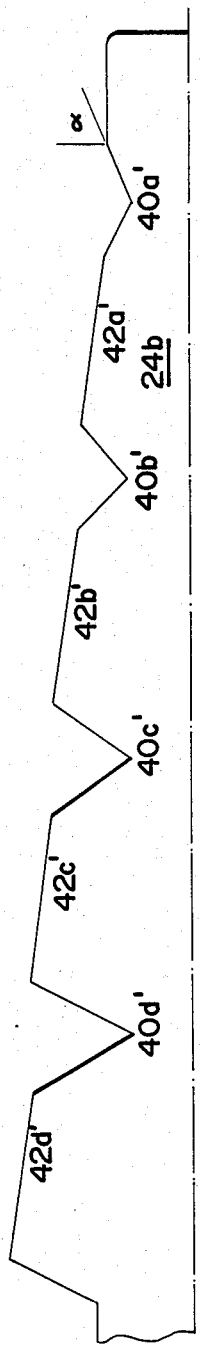
Figure 3C:
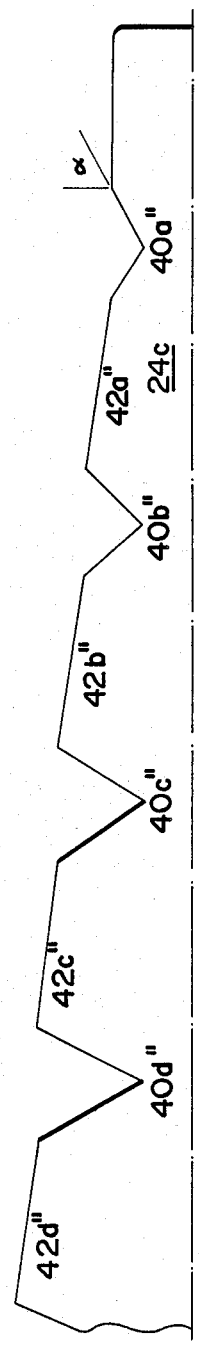
Figure 3D:
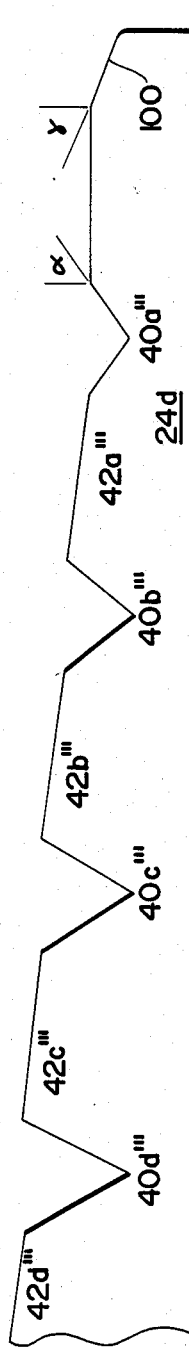

The second, third and fourth chasers 24b, 24c, 24d are illustrated in FIGS. 3B-3D, respectively. The second, third and fourth chasers do not include a fifth notch for reasons set forth hereinafter. However, each of the second, third and fourth chasers is similar to the first chaser in that each includes a series of cutting edges 42 alternating with a series of notches 40 for forming the thread and tapered portion. Therefore, the cutting edges and notches in the series of cutting edges and notches in the first chaser have corresponding cutting edges and notches in the series of cutting edges and notches on the second, third and fourth chasers. As used herein, the term "series" will refer to the arrangement of cutting edges and notches on one chaser (exclusive of the last or additional notch and cutting edge on the first chaser). The term "set" will refer to the arrangement of corresponding cutting edges and notches on all four chasers, i.e., the set of first notches includes the first notches on the four chasers.

As evident from FIGS. 3A-3D, the cutting edge profile of each chaser is different from an adjacent chaser. When four chasers are employed, each chaser is symmetrically located around the shank at intervals of 90° and adapted to cut a quarter of the thread as the spike is rotated. That is, the first chaser cuts the first quarter of the thread turns, while the succeeding chasers cut the remaining quarters. The series of cutting edges and notches are therefore moved rearwardly on successive chasers. For example, the first cutting edge 42a' in the series of cutting edges on the second chaser 24b is located rearwardly of the corresponding cutting edge 42a of the preceding first chaser 24a. Likewise, the first cutting edge 42a'' on the third chaser 24c is located rearwardly of the cutting edge 42a' on the second chaser 24b.

In addition to the cutting edges being located rearwardly of corresponding cutting edges on preceding chasers, the cutting edges on one chaser must cut successively deeper into the shank than the corresponding cutting edge on the preceding chaser. In other words, a cutting edge in the series of cutting edges on the second chaser penetrates successively deeper than the corresponding cutting edge on the preceding first chaser. This is evident from FIGS. 3A-3D wherein the first notch on the first chaser has a particular depth. The first notch on the second chaser has a depth which is deeper than the depth of the first notch on the first chaser. The depth of the set of first notches of the four chasers successively increases so that the shank has a constant crest diameter for one thread turn. Moreover, the depth of the successive sets of notches on the four chasers successively increase so that the crest diameter is constant for successive thread turns.

The profiles of the chasers are also different due to the different flank angles on each notch of each chaser. As noted above with regard to the first chaser, the forward and rearward flank angles of the series of notches on one chaser differ for each notch in the series of notches on that chaser. Moreover, the forward and rearward flank angles of any notch in a set of notches are generally different from other notches in the set. The different flank angles for each notch are necessary to form the thread of constant root and crest diameter across the tapered portion of the spike, and results in each chaser having a unique cross-section.

Generally, the angles $\alpha$, $\gamma$ of a notch on one chaser successively decrease relative to the angle $\alpha$, $\gamma$ on a corresponding notch on a succeeding chaser. For example, the angle $\alpha$ in the first set of notches successively decreases from the first notch 40a on the first chaser 24a to the first notch 40a''' on the fourth chaser 24d. The flank angles of the first notch 40a''' on the fourth chaser 24d are greater than the flank angles of the second notch 40b on the first chaser 24.

However, the fourth notch 40d', 40d'', 40d''' and cutting edge 42d', 42d'', 42d''' of the second, third and fourth chasers closely approximate the thread cut by the fifth notch 40e and cutting edge 42e on the first chaser since they are only three-quarters of a thread turn away from the cylindrical portion. Theoretically, the differences between the angles $\alpha$, $\gamma$ on the fourth notch of the second, third and fourth chasers and the angles $\alpha$, $\gamma$ on the fifth notch of the first chaser become considerably small. In practice, the differences are considered negligible so that the flank angles of the fourth notches of the second, third and fourth chasers are cut to equal the flank angles of the fifth notch of the first chaser. A fifth notch on the second, third and fourth chasers is therefore unnecessary and preferably removed in practice.

On the second, third and fourth chasers, the forward flank angle is generally less than the rearward flank angle for each notch on those chasers. An exception exists for the first notch of the second chaser in which the forward flank angle is greater than the rearward flank angle. The reason for this discrepancy is similar to that noted above for the first notch of the first chaser, i.e., the 4° taper of the shank and the constant root requirement. By the time the thread has progressed to the first notch of the third and fourth chasers (i.e., beyond the first half turn of the thread), the forward flank angle is less than the rearward flank angle.

In operation, the chasers are arranged at 90° intervals in the tool holder ring. Preferably, the tool holder ring is rotated and axially advanced toward the spike. As the tip of the cylindrical shank of the blank spike enters the tool holder ring, it is engaged by the first notches of the chasers, each cutting a quarter thread turn. As the tip of the shank progresses through the tool holder, the successive sets of cutting edges and notches progressively penetrate deeper into the shank, each cutting beyond the bounds reached by the preceding notch and cutting edge. When the tip of the shank reaches the additional notch and cutting edge on the first chaser, it is cut to form the cylindrical portion with the thread thereon. The tip axially advances beyond the additional notch and cutting edge for a distance corresponding to the length of the cylindrical portion, whereupon the tool holder ring is opened to retract the chasers from the spike and withdraw the spike from the tool holder ring.

As noted above, the fourth notch on the second, third and fourth chaser are approximately equal to the additional notch on the first chaser. Accordingly, when the tip of the shank progresses beyond the fourth notch on the second, third and fourth chasers, it is formed with the appropriate thread on the cylindrical portion. Further, it is noted that the fourth chaser may be provided with a run-out notch 100 preceding the first notch 40e on the first chaser 24a. The run-out notch 100 has a rearward flank angle greater than that of the first notch on the first chaser. The run-out notch 100 therefore cooperates with the first notch 40e on the first chaser to form a gradual increase in thread height at the start of the tapering portion of the spike.

Preferred dimensions for the chasers are set forth below in Table 2. When chasers are used having the characteristics of Table 2, a spike is formed having the characteristics of Table 1. As an example, applicants have manufactured threaded spikes using the chasers described in Table 2. A satisfactory thread spike was produced, the threads having the characteristics of Table 1.

TABLE 2

|  | Notch No. 1 | Notch No 2. | Notch No. 3 | Notch No. 4 | Notch No. 5 |
|---|---|---|---|---|---|
| Chaser No. 1 | | | | | |
| Forward Flank Angle | 71° 28' | 47° 26' | 33° 40' | 25° 38' | 24° 45' |
| Rearward Flank Angle | 68° 29' | 50° 7' | 38° 4' | 31° 21' | 31° 21' |
| Chaser No. 2 | | | | | |
| Forward Flank Angle | 64° 19' | 43° 13' | 31° 16' | 24° 45' | 24° 45' |
| Rearward Flank Angle | 63° 14' | 46° 36' | 35° 48' | 31° 21' | Removed |
| Chaser No. 3 | | | | | |
| Forward Flank Angle | 57° 55' | 39° 35' | 29° 9' | 24° 45' | 24° 45' |
| Rearward Flank Angle | 68° 25' | 43° 27' | 33° 45' | 31° 21' | Removed |
| Chaser No. 4 | | | | | |
| Forward Flank Angle | 52° 19' | 36° 25 | 27° 17' | 24° 45 | 24° 45' |
| Rearward Flank Angle | 54° 3' | 40° 37' | 31° 53' | 31° 21' | Removed |
| (Rearward Flank Angle of Run-Out Notch 74° 9') | | | | | |
| Characteristics of All Notches | | | | | |
| Root | | | .157 inches | | |
| Axial length traversed by forward flank | | | .069 inches | | |
| Axial length traversed by rearward flank | | | .088 inches | | |
| Gap | | | .335 inches | | |
| Pitch | | | .492 inches | | |

The use of chasers in accordance with the presently claimed invention permits a proper and precise thread to be formed on the railroad spike. That is, the thread is accurately cut on the spike with the proper constant gap between adjacent turns of the spike, a constant crest diameter and a constant root. Further, the accurate threading of the spike is accomplished even though the spike is tapered and has a relatively large diameter. The use of tangential chasers therefor permits for a continuous peeling of material from the spike which provides for a smooth, efficient and economical thread forming operation.

The principles, preferred embodiments and modes of operation of the present invention have been described in the forgoing specification. The invention which is to protected herein, however, is not to be construed as limited to the particular forms disclosed, since these are to be regarded as illustrative rather than restrictive. Variations and changes may be made by those skilled in the art without departing from the spirit of the invention. Accordingly, it is expressly intended that such variations and changes which fall within the spirit and scope of the present invention as defined in the claims be embraced thereby.

What is claimed is:

1. A plurality of thread cutting chasers for forming a tapering portion and cutting thereon a thread on a spike when said plurality of chasers are rotating relative to and axially advancing along a central axis of said spike, said spike having a head, a tip opposite said head, and a shank therebetween, the tip of said shank being located forwardly of said head in an advancement direction of said spike, said thread having on said tapered portion a constant crest diameter, a constant root, a constant pitch and a constant gap between adjacent turns of said thread, said chasers comprising:

a cutting edge profile on each chaser extending from a forward end of the chaser to a rearward end in the advancement direction of said spike, each cutting edge profile having a series of tapered cutting edges alternating with a series of thread forming notches, each of said notches having a forward flank and a rearward flank intersecting at a crest of said notch, forward and rearward acute flank angles being respectively defined between said forward flank and said rearward flank and a normal to said central axis, each notch in said series of notches having a constant root and forward and rearward acute flank angles different from the forward and rearward acute flank angles of an adjacent notch in said series of notches, each of said cutting edges being defined between a forward flank of one notch and a rearward flank of a preceding notch, the crests of adjacent notches being separated by one pitch, said cutting edges having equal lengths each corresponding to the length of said gap, each of said cutting edges penetrating successively deeper into said shank in the advancement direction of said spike;

each of said plurality of chasers having a different cutting edge profile, a cutting edge in the series of cutting edges on one chaser being located rearwardly of and penetrating successively deeper than a corresponding cutting edge in the series of cutting edges on a preceding chaser, the forward and rearward acute flank angles on a thread cutting notch on one chaser being no greater than the forward and rearward acute flank angles on a corresponding thread cutting notch on a preceding chaser.

2. The chasers of claim 1, wherein four chasers are provided, each chaser cutting a quarter of a thread turn.

3. The chasers of claim 1, wherein the forward acute flank angles of a series of thread forming notches on a chaser successively decrease from the forward end to the rearward end.

4. The chasers of claim 1, wherein the rearward acute flank angles of a series of thread forming notches on a chaser successively decrease from the forward end to the rearward end.

5. The chasers of claim 1, wherein each notch has unequal forward and rearward acute flank angles.

6. The chasers of claim 1, wherein the forward acute flank angle is less than the rearward acute flank angle for each notch exclusive of notches which form an initial half thread turn adjacent the head of the spike.

7. The chasers of claim 1, wherein the least forward acute flank angle of a set of corresponding notches on said plurality of chasers is greater than the largest forward acute flank angle of a succeeding set of corresponding notches on said plurality of chasers.

8. The chasers of claim 1, wherein the least rearward acute flank angle of a set of corresponding notches on said plurality of chasers is greater than the largest rearward acute flank angle of a succeeding set of corresponding notches on said plurality of chasers.

9. The chasers of claim 1, wherein the number of notches in said series of notches is equal to the length of said tapering portion divided by the pitch of said thread.

10. The chasers of claim 9, wherein a first one of said chasers is provided with an additional notch and untapered cutting edge located adjacent to a rearward end of said first chaser and rearwardly of a last notch and tapered cutting edge in said series of said notches and tapered cutting edges on said first chaser, said additional notch being spaced from said last notch by one pitch, the forward acute flank angle of said additional notch being less than the forward acute flank angle of the last notch, the rearward acute flank angle of said additional notch being no greater than the rearward acute flank angle of said last notch, said additional notch and untapered cutting edge forming a cylindrical portion of said shank rearwardly of said tapering portion of said shank and cutting said thread on said cylindrical portion.

11. An apparatus for cutting a thread in a railroad spike having a head, a tip opposite said head and a cylindrical shank therebetween with a constant diameter, said thread having a constant crest diameter, a constant root, a constant pitch and a constant gap between adjacent turns of said thread, said apparatus comprising;

a tool holder having a central axis;

means for rotatably and axially advancing said spike relative to said tool holder along said central axis, said tip of said shank being located forwardly of said head in an advancement direction of said spike; and a plurality of chasers fixedly supported by said tool holder in a symmetrical arrangement about said central axis for tapering a portion of said shank while cutting the thread on the tapered portion of said shank, each of said chasers having a cutting edge profile that includes a series of tapered cutting edges alternating with a series of thread forming notches between forward and rearward ends of said chaser, each of the thread forming notches having a forward flank and rearward flank intersecting at a crest of said notch, forward and rearward acute flank angles being respectively defined between said forward and rearward flanks and a normal to said central axis, each of said thread forming notches having a constant root and forward and rearward acute flank angles different from an adjacent notch in said series of notches, each of said cutting edges being defined between a forward flank of one notch and rearward flank of a preceding notch, the crests of adjacent notches being separated by one pitch, said cutting edges having equal lengths corresponding to the length of said gap, said series of cutting edges on each chaser penetrating successively deeper into said shank in the advancement direction of said spike;

each of said plurality of chasers having a different cutting edge profile, a cutting edge in the series of cutting edges on one chaser being located rearwardly of and penetrating successively deeper than a corresponding cutting edge in the series of cutting edges on a preceding chaser, the forward and rearward acute flank angles on a thread cutting notch on one chaser being no greater than the forward and rearward acute flank angles on a corresponding thread cutting notch on a preceding chaser.

12. The apparatus of claim 11, wherein four chasers are provided, each chaser cutting a quarter turn of said thread.

13. The apparatus of claim 11, wherein said forward and rearward acute flank angles in a series of thread forming notches successively decrease from the forward end to the rearward end.

14. The apparatus of claim 11, wherein the least forward acute flank angle of a set of corresponding notches on said plurality of chasers is greater than the largest forward acute flank angle of a succeeding set of corresponding notches on said plurality of chasers.

15. The apparatus of claim 11, wherein the least rearward acute flank angle of a set of corresponding notches on said plurality of chasers is greater than the largest rearward acute flank angle of a succeeding set of corresponding notches on said plurality of chasers.

16. The apparatus of claim 11, wherein said tool holder is fixed and said spike is rotated and axially advanced.

17. The apparatus of claim 11, wherein the number of notches in said series of notches is equal to the length of said tapering portion divided by the pitch of said thread.

18. The apparatus of claim 11, wherein a first one of said chasers is provided with an additional notch and untapered cutting edge located adjacent to a rearward end of said first chaser and rearwardly of a last notch and tapered cutting edge in said series of said notches and tapered cutting edges on said first chaser, said additional notch being spaced from said last notch by one pitch, the forward acute flank angle of said additional notch being less than the forward acute flank angle of the last notch, the rearward acute flank angle of said additional notch being no greater than the rearward acute flank angle of said last notch, said additional notch and untapered cutting edge forming a cylindrical portion of said shank rearwardly of said tapering portion of said shank and cutting said thread on said cylindrical portion.

19. The apparatus of claim 18, wherein four notches are provided in said series of notches.

* * * * *